US011936763B2

(12) United States Patent
Chapman et al.

(10) Patent No.: US 11,936,763 B2
(45) Date of Patent: Mar. 19, 2024

(54) HANDLING DEFERRABLE NETWORK REQUESTS

(71) Applicant: International Business Machines Corporation, Armonk, NY (US)

(72) Inventors: Matthew Paul Chapman, Eastleigh (GB); Chengxuan Xing, Romsey (GB); Ashley Donald Harrison, Southampton (GB); Samuel David Goulden, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/082,121

(22) Filed: Oct. 28, 2020

(65) Prior Publication Data
US 2022/0131959 A1    Apr. 28, 2022

(51) Int. Cl.
*H04L 69/22*    (2022.01)
*H04L 69/24*    (2022.01)

(52) U.S. Cl.
CPC .............. *H04L 69/22* (2013.01); *H04L 69/24* (2013.01)

(58) Field of Classification Search
CPC ......... H04L 69/22; H04L 69/24; H04L 29/06; H04L 67/02; H04L 67/568; H04L 67/62
USPC ......................................................... 709/219
See application file for complete search history.

(56) References Cited

U.S. PATENT DOCUMENTS

| | | | |
|---|---|---|---|
| 8,204,082 B2 * | 6/2012 | Jungck | H04L 47/24 370/498 |
| 9,397,968 B2 | 7/2016 | Wang | |
| 9,870,349 B2 | 1/2018 | Wei | |
| 9,942,299 B2 | 4/2018 | Wei | |
| 10,455,040 B2 | 10/2019 | Lahman | |
| 2008/0229023 A1 * | 9/2008 | Plamondon | G06F 12/0875 709/218 |

(Continued)

FOREIGN PATENT DOCUMENTS

| | | |
|---|---|---|
| CN | 116368786 A | 6/2023 |
| WO | 2012019621 A1 | 2/2012 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Schquita D Goodwin
*Assistant Examiner* — Mehulkumar J Shah
(74) *Attorney, Agent, or Firm* — Brian M. Restauro

(57) ABSTRACT

Embodiments of the present invention provide methods, computer program products, and systems. Embodiments of the present invention can identify a network request as being deferrable and embed data of the deferrable network request within a header of a suitable carrier network request for sending to a remote server. Embodiments of the present invention can receive a carrier network request with embedded data of a deferrable network request within a header of the carrier network request. Embodiments of the present invention can then parse the embedded data from the header into a separate request message for actioning at the server.

15 Claims, 9 Drawing Sheets

(56) References Cited

U.S. PATENT DOCUMENTS

| | | | |
|---|---|---|---|
| 2009/0106377 A1* | 4/2009 | McQuillen | H04L 51/02 |
| | | | 709/206 |
| 2011/0066676 A1* | 3/2011 | Kleyzit | H04L 67/289 |
| | | | 709/203 |
| 2012/0036264 A1* | 2/2012 | Jiang | H04L 67/02 |
| | | | 709/226 |
| 2013/0124680 A1* | 5/2013 | Fu | H04L 67/02 |
| | | | 709/217 |
| 2014/0012981 A1* | 1/2014 | Samuell | H04L 47/40 |
| | | | 709/224 |
| 2014/0188970 A1* | 7/2014 | Madhok | H04L 67/63 |
| | | | 709/201 |
| 2015/0067819 A1* | 3/2015 | Shribman | H04L 67/141 |
| | | | 709/218 |
| 2017/0199850 A1* | 7/2017 | Mishra | G06F 16/9574 |
| 2020/0005190 A1 | 1/2020 | Yang | |
| 2020/0319799 A1* | 10/2020 | Mayer | G06F 3/065 |

FOREIGN PATENT DOCUMENTS

| | | |
|---|---|---|
| WO | 2014062921 A1 | 4/2014 |
| WO | 2017122981 A1 | 7/2017 |
| WO | 2022090847 A1 | 5/2022 |

OTHER PUBLICATIONS

"Patent Cooperation Treaty PCT Notification of Transmittal of the International Search Report and the Written Opinion of the International Searching Authority, or the Declaration", International application No. PCT/IB2021/059396, International filing date Oct. 13, 2021 (Oct. 13, 2021), Priority Date Oct. 28, 2020 (Oct. 28, 2020), 9 pages.

Anonymous, "Intercept HTTP requests", Mozilla, downloaded from the internet on Mar. 1, 2023, <https://developer.mozilla.org/en-US/docs/Mozilla/Add-ons/WebExtensions/Intercept_HTTP_requests>, 7 pages.

* cited by examiner

HANDLING DEFERRABLE NETWORK REQUESTS

BACKGROUND

The present invention relates to handling network requests, and more specifically, to handling deferrable network requests.

Network requests in the form of Hypertext Transfer Protocol (HTTP) requests are used for communication between a client and a server in a network environment. An HTTP request method from a client indicates a desired action to be performed at the server on a given resource. The resource is identified by a request Uniform Resource Locator (URL) and each request method implements a distinct semantic. For example, web applications typically run code in a browser and submit HTTP requests back to a server, to send or retrieve data.

Many HTTP requests need to be processed by the server immediately, but some requests are less time-sensitive and may be deferrable. An example of a deferrable request is a request to track data for user analytics. This data is useful for developers in understanding user behavior, but it is not critical for the immediate functionality of the web application.

The information contained in such HTTP requests is usually very small compared to the overhead that comes with an HTTP request (headers, cookies, etc.) and developers often need to design strategies to handle failures of such calls.

Therefore, such extra requests often lead to inefficiencies in network traffic and use of resources.

SUMMARY

According to a first aspect of the present invention there is provided a computer-implemented method for handling deferrable network requests, the method carried out at a user agent of a client and comprising: intercepting and identifying a network request as being deferrable; and embedding data of the deferrable network request within a header of a suitable carrier network request for sending to a remote server.

This has the advantage of reducing a number of network requests by waiting for a non-deferrable network request in which one or more deferrable network requests can be carried in its headers.

The method may include: storing the data of the deferrable network request in a local cache at the client in the form of aggregated data of a target destination of the deferrable network request and a request message data; identifying a suitable carrier network request; and embedding the aggregated data of the deferrable request within the header of the carrier network request. The method may include embedding the aggregated data of each of multiple deferrable requests within one of multiple headers of the carrier network request. The suitable carrier network request is not deferrable and may have a sufficient space for the deferrable request data.

Identifying a network request as being deferrable may include intercepting a network request message and determining if the request network message is being sent to a host in a list of predefined deferrable destinations. The method may include obtaining from a server a defined header name for use when embedding deferrable request data in the header.

The method may include batch sending cached deferrable network request data once the cache reaches a predefined size or when leaving the user agent, wherein batch sending selects a cached deferrable network request as a carrier network request and adds other cached deferrable request data in one or more headers of the carrier network request.

The method may include: receiving a carrier network response with embedded data of a response to a deferable network request within a header of the carrier network response; and parsing the embedded data from the header into a separate response message for actioning at the client.

The method may include, for each deferrable network request that is added to a suitable carrier network message, marking the deferrable network request as in progress and updating the deferrable network request when a successful response is received.

According to another aspect of the present invention there is provided a computer-implemented method for handling deferrable network requests, the method carried out at a server and comprising: receiving a carrier network request with embedded data of a deferrable network request within a header of the carrier network request; and parsing the embedded data from the header into a separate request message for actioning at the server.

The embedded data of a deferrable network request may be aggregated data of a target destination of the deferrable network request and a request message data and parsing the embedded data may form a separate request message to the target destination.

The method may include receiving a batch of deferrable network requests for individual processing at the server.

The method may include: intercepting and identifying a deferrable network response; and embedding data of the deferrable network response within a header of a suitable carrier network response for sending back to a client. The method may include: storing the data of the deferrable network response in a local cache at the server in the form of aggregated data of a target destination of the deferrable network response and a response message data; identifying a suitable carrier network response; and embedding the aggregated data of the deferrable response within the header of the carrier network response. The method may include embedding the aggregated data of each of multiple deferrable responses within one of multiple headers of the carrier network request.

The method may further include sending from the server a defined header name for use by a user agent when embedding deferrable request data in the header of a carrier network request.

The method may include receiving a batch of deferrable network requests for individual processing at the server in the form of a deferrable network request as a carrier network request and other cached deferrable request data provided in one or more headers of the carrier network request.

According to a further aspect of the present invention there is provided a system for handling deferrable network requests, comprising: a client system including a processor and a memory configured to provide computer program instructions to the processor to execute the function of the components: a request intercepting component for intercepting a network request and a deferrable request identifying component for identifying a network request as being deferrable; and a header embedding component for embedding data of the deferrable network request within a header of a suitable carrier network request for sending to a remote server.

The client system may include: a deferrable request storing component for storing the data of the deferrable network request in a local cache at the client in the form of aggregated data of a target destination of the deferrable network request and a request message data; and a carrier request identifying component for identifying a suitable carrier network request.

The client system may include: a batch sending component for batch sending cached deferrable network request data once the cache reaches a predefined size or when leaving the user agent; and a batch receiving component for receiving batched responses to deferrable network requests.

The client system may include: a carrier response receiving component for receiving a carrier network response with embedded data of a response to a deferable network request within a header of the carrier network response; and a response parsing component for parsing the embedded data from the header into a separate response message for actioning at the client.

According to another aspect of the present invention there is provided a system for handling deferrable network requests, comprising: a server having a processor and a memory configured to provide computer program instructions to the processor to execute the function of the components: a carrier request receiving component for receiving a carrier network request with embedded data of a deferrable network request within a header of the carrier network request; and a request parsing component for parsing the embedded data from the header into a separate request message for actioning at the server.

The server system may include: a response intercepting component for intercepting a network response and a deferrable response identifying component for identifying a deferrable network response; and a header embedding component for embedding data of the deferrable network response within a header of a suitable carrier network response for sending back to a client.

The server system may include: a deferrable response storing component for storing the data of the deferrable network response in a local cache at the server in the form of aggregated data of a target destination of the deferrable network response and a response message data; a carrier response identifying component for identifying a suitable carrier network response.

The server system may include: a batch request receiving component for receiving a batch of deferrable network requests for individual processing at the server; and a batch response sending component for batch sending cached deferrable network response data once the cache reaches a predefined size at the server.

According to another aspect of the present invention there is provided computer program product for handling deferrable network requests, the computer program product comprising a computer readable storage medium having program instructions embodied therewith, the program instructions executable by a processor to cause the processor to: intercept and identify a network request as being deferrable; and embed data of the deferrable network request within a header of a suitable carrier network request for sending to a remote server.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Methods and systems are described for handling deferrable network requests. Network requests in the form of Hypertext Transfer Protocol (HTTP) requests are used for communication between a client and a server in a network environment. An HTTP request method from a client indicates a desired action to be performed at the server on a given resource. The resource is identified by a request Uniform Resource Locator (URL) and each request method implements a distinct semantic.

The described method embeds data of deferrable requests (for example, lightweight routine requests) into headers of non-deferrable requests from the client (for example, requests for functional purposes). The headers may then be extracted on the server side and the request data sent to the destination locations on the server side. A corresponding method of returning responses of the deferrable request in reply headers of non-deferrable requests is also provided.

Figure 1:
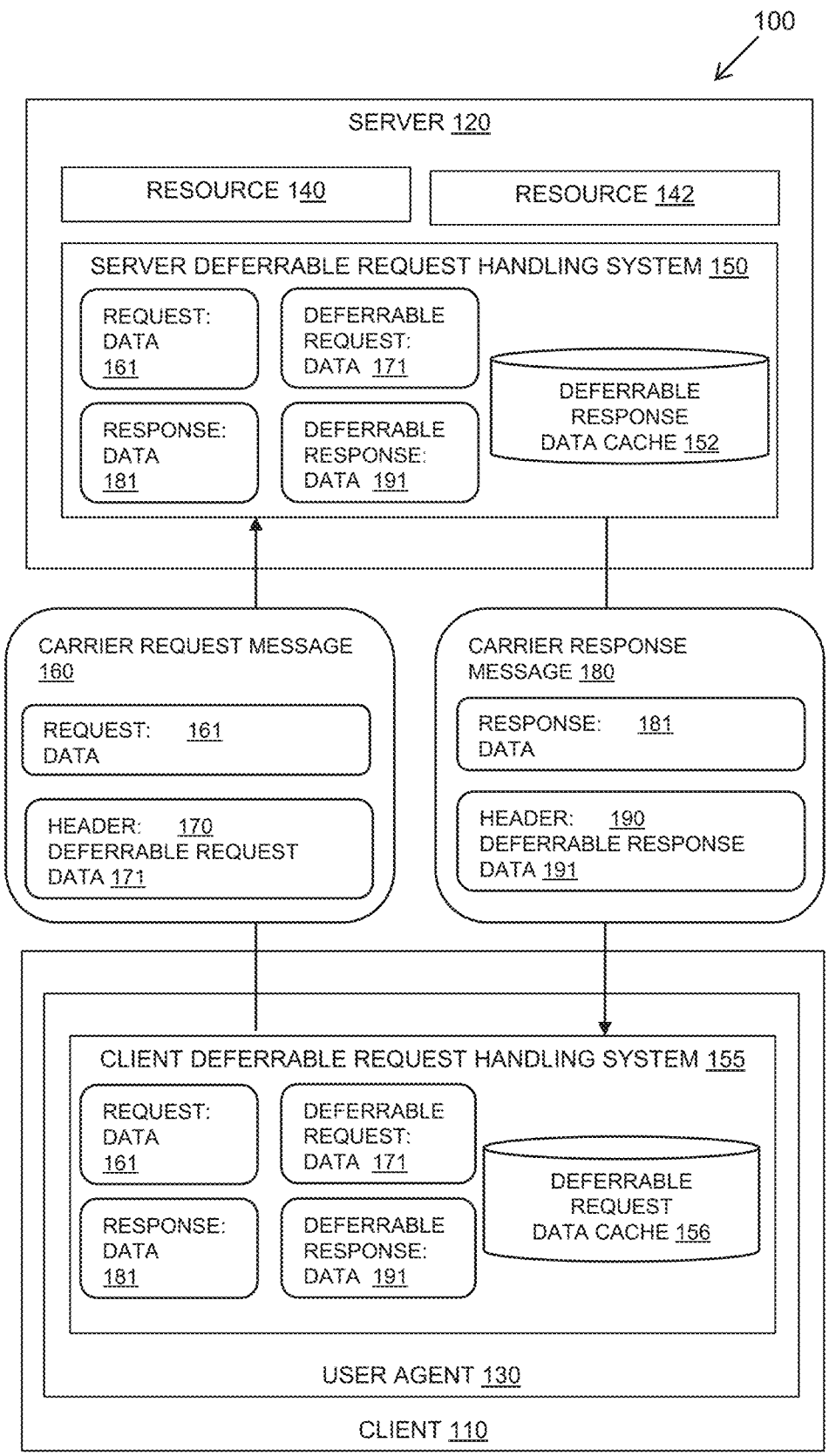
FIG. 1 is a schematic diagram of an example embodiment of a method, in accordance with the present invention.

Referring to FIG. 1, a schematic diagram 100 shows an example embodiment of a client 110 and a server 120 between which HTTP requests and responses are exchanged. In this example, a user agent 130 (for example, a web browser) at the client 110 sends requests to resources 140, 142 (for example, web applications) at the server 120.

In typical requests, the client 110 submits an HTTP request message to the server 120 and the server 120, which provides resources 140, 142, such as HTML files and other content, or performs other functions on behalf of the client 110, returns a response message to the client 110. The response contains completion status information about the request and may also contain requested content in its message body.

A web browser is an example of a user agent (UA) 130. Other types of user agent 130 include the indexing software used by search providers (web crawlers), voice browsers, mobile applications, and other software that accesses, consumes, or displays web content.

A deferrable request handling system 150, 155 is provided in the form of a server deferrable request handling component 150 and a client deferrable request handling component 155. The client component 155 may be code provided by the server component 150 to be downloadable or executable at the client 110 to provide functionality to complement the server component 150. The client component 155 includes or accesses a deferrable request data cache 156 local to the client 110 in which to cache deferrable requests as described further below. The server component 150 includes or accesses a deferrable response data cache 152 local to the server 120 in which to cache deferrable request responses as described further below.

The client deferrable request handling system 155 intercepts a request at the client 110 and determines if the request is deferrable or if it is non-deferrable and should be sent straightaway. It the request is deferrable it may be cached in the deferrable request data cache 156 until a time at which it is sent combined into a header 170 of a carrier request message 160 in the form of a subsequent non-deferrable request. Several deferrable request messages may be sent in multiple headers 170 of a carrier request message 160.

A non-deferrable request message that acts as a carrier request message 160 may be sent with its own request data 161 and with deferrable request data 171 embedded into a header 170 of the carrier request message 160. When such a message is received at the server 120, the server deferrable request handling system 150 handles the carrier message request data 161 and separates out the deferrable request data 171 and handles this separately.

Once the deferrable request data 171 has been actioned and deferrable response data 191 is available, the deferrable response data 191 may be cached in the deferrable response data cache 152 local to the server 120 to await a carrier response message 180 to deliver it to the client deferrable request handling system 155 at the user agent 130 of the client 110.

A non-deferrable response message may act as a carrier response message 180 and may be sent with its own response data 181 and with deferrable response data 191 embedded into a header 190 of the carrier response message 180. When such a message is received at the client 110, the client deferrable request handling system 155 handles the carrier message response data 181 and separates out the deferrable response data 191 and handles this separately.

Further details of example embodiments of the method at the server and client are given below.

A request message includes: a request line, which specifies the request method and requests a specified resource from the server; a request header field; an empty line; and an optional message body.

HTTP defines request methods that may be the subject of a request message to indicate the desired action to be performed by the server 120 on the identified resource 140, 142. Examples of request methods include, but are not limited to, a method to identify and/or resolve errors (e.g. TRACE HTTP request), a method to receive a status notification (e.g. STATUS HTTP request), a method to retrieve information (e.g. GET HTTP request), a method to send data (e.g. POST HTTP request), a method to remove predefined information (e.g. DELETE HTTP request), a method to establish a communication flow (e.g. CONNECT HTTP request), a method to describe communication options (e.g. OPTIONS HTTP request), a method to create a new resource or replace a resource (e.g. PUT HTTP request), a method to make a partial change to a resource (e.g. PATCH HTTP request), and a method to request a header of a resource (e.g. HEAD HTTP request).

Some request messages may be considered to be deferrable if they are less time-sensitive and do not need to be processed by the server immediately. An example is tracking data for user analytics. Such tracking data is useful for developers in understand user behavior, but it is not critical for the immediate functionality of a web application. On the other hand, request messages that relate to the functionality of a web application are non-deferrable.

HTTP headers allow a client and a server to pass additional information with an HTTP request or response. Custom proprietary headers may have an "X-" prefix. This additional information is used in the described method for data relating to a deferrable request message in the form of the message destination and data. The server then extracts the header information and handles the request data by sending it to the message destination.

A non-deferrable request message forms a carrier request message with its header containing the deferrable request message destination and data. The carrier request message and the deferrable request message may relate to different request methods.

Figure 2:
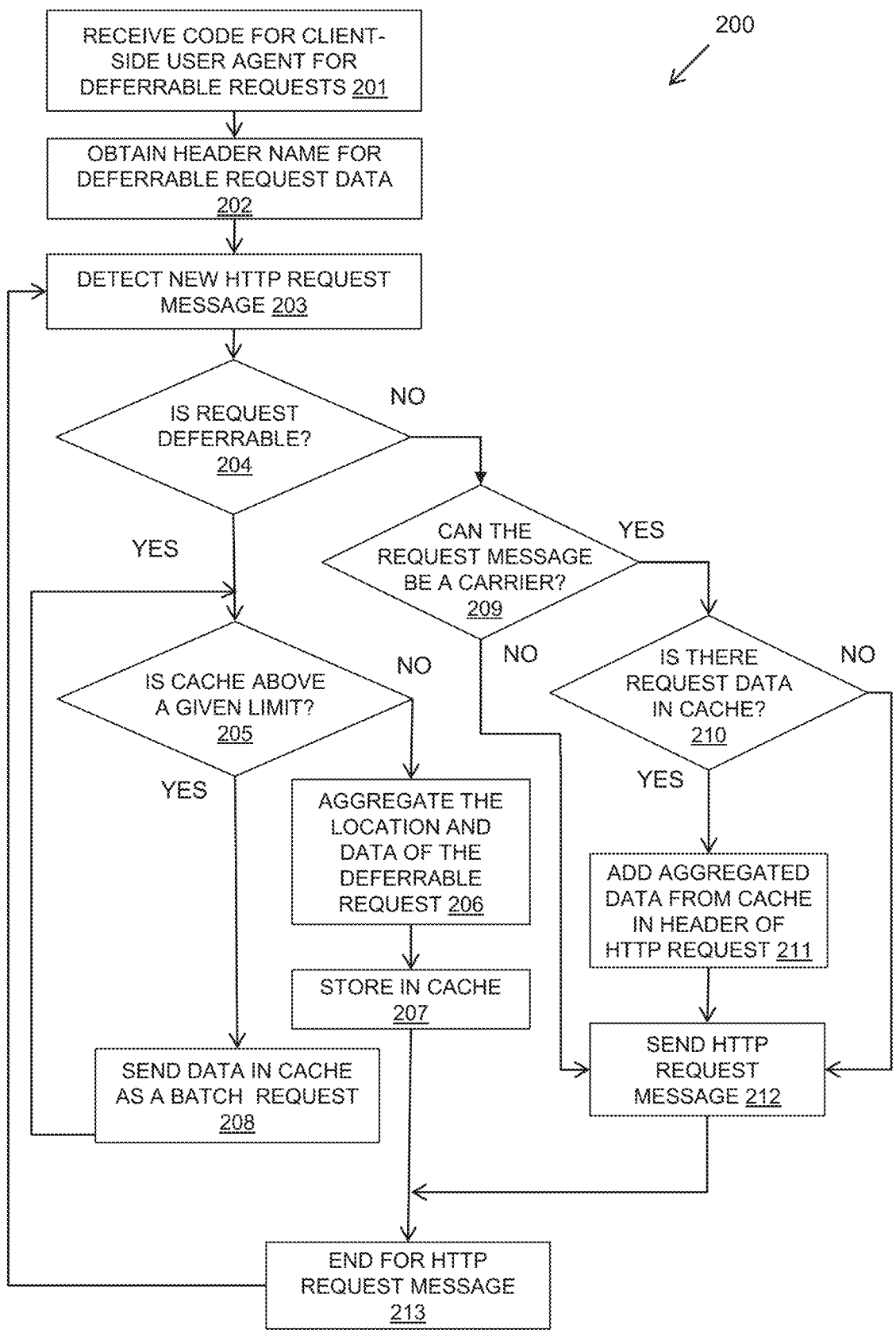
FIG. 2 is a flow diagram of an example embodiment of another aspect of a method at a client, in accordance with the present invention.

Referring to FIG. 2, a flow diagram 200 shows an example embodiment of the described method as carried out at a client 110 by a client deferrable request handling system 155.

The client deferrable request handling system 155 may receive 201 code for client-side user agents, such as web browsers, client applications, etc., that send HTTP request messages to a server having a server deferrable request handling system 150. The client deferrable request handling system 155 may be provided as a browser extension, for example to, intercept deferrable HTTP requests and to cache deferrable request data. The client deferrable request handling system 155 may either intercept a HTTP request at the native browser network level or it may patch calls to the "fetch" or XMLHttpRequest functions used by client applications.

The client deferrable request handling system 155 may obtain 202 a defined header name for use when sending deferrable request messages embedded in a header of another request message. For example, the defined header name may be obtained by the client deferrable request handling system 155 making a REST call to the server. In the case of a custom header, the client-side may call a known server route, for example, /api/getDeferrableHeader, that responds with the name of the header that is going to be used for that session (for example, which may be generated using a universally unique identifier). Alternatively, a fixed defined header name may be used for all such messages.

The method at the client may detect 203 a new HTTP request message to be sent to a server and it determines 204 if the request message is deferrable. Whether or not a request is deferrable may depend on the destination hostname and/or path of the request. The request message may be determined 204 to be deferrable by checking if the request message is being sent to a host in a list that is pre-configured. The list may be held by the server and exposed it to the client via a REST interface.

A request message may also only be deferrable if it is below a given size. A request header field is typically between 200 bytes and 2 kilobytes in size and the deferrable request data must fit within a request header.

If the request message is considered to be deferrable, the method may determine 205 if a cache of deferrable request messages is above a given limit. If the cache is not above a given limit, the new deferrable request message is aggregated 206 to a form comprising the destination and the data of the request and stored 207 in the cache. The method may then end 213 for this request message and the method may loop to detect 203 a new request message.

If the cache is determined 205 to be above a given limit, the cached deferrable request data may be sent 208 as a batch request message to clear or make room in the cache. A special request may be made for sending 208 the batch request message, which is treated like a non-deferrable request, such that the cached requests are attached to it. One of the deferrable requests may be chosen as the carrier request for the other deferrable requests in the cache. For each deferrable request that is added to the carrier message's header, the deferrable requests are marked as "in progress/sent". The special request may be made to a custom route provided by the server, which returns an empty response. Once room has been made in the cache, further deferrable request data can be stored.

If it is determined 204 that a request message is not deferrable, it may be determined 209 if the request message is suitable to be a carrier message for deferrable request messages. For example, if there is space in the request message to carry one or more deferrable request messages in one or more headers. If there is not sufficient space or other reason for the request message not to carry a deferrable request message, the method may send 212 the request message without carrying any deferrable request messages. The method may then end 213 for this request message and the method may loop to detect 203 a new request message.

If the request message is suitable to be a carrier message, the method may check 210 if there is request message data in the cache. If there is no cached request message data, then the method may send 212 the request message. If there is cached request message data, the aggregated form of the destination and the data of a cached request is added 211 to a header field of the carrier request message. Multiple deferrable requests may be attached to one carrier message and they may be attached via separate headers, for example, "X-Deferrable-Data" and then "X-Deferrable-Data-2", "X-Deferrable-Data-3", etc. For each deferrable request that is added to the carrier message's header, the deferrable requests are marked as "in progress/sent".

Once the deferrable request message data has been added to the message request's header field or fields, the request message may be sent 212. The method may then end 213 for this request message and the method may loop to detect 203 a new request message.

When a user moves away from the user agent 130, such as a web application or web browser, the cached data of all deferrable request data that has not yet been sent, is sent as a separate special batch request. The method may issue a special batch request in a similar manner as the "cache full" scenario above. Multiple deferrable requests may be attached to this special batch request, as above.

The following is an example form of request messages:
Deferrable request:
POST https://datacollectionresource/tracking { . . . tracking data . . . }
Normal request:
POST https://domain.com/api/flows/flow1/start { . . . request data . . . }
Single combined request:
POST https://domain.com/api/flows/flow1/start { . . . request data . . . }
with extra header:
X-Deferrable-Data: {destination: https://datacollectionresource/tracking data: { . . . tracking data . . . }, method: 'POST'}

The deferrable data provided in the header will need all the parameters that the original request required. In the simplest case, this may be just the method or method plus body, but may include all the properties defined by the Request fetch interface.

When a new HTTP response message is received at the client 110, it is determined if the response message contains deferrable responses in its headers. If it does, the successful deferrable responses are extracted and sent to each requester and the deferrable requests are removed from the deferrable request data cache 156.

Figure 3A:
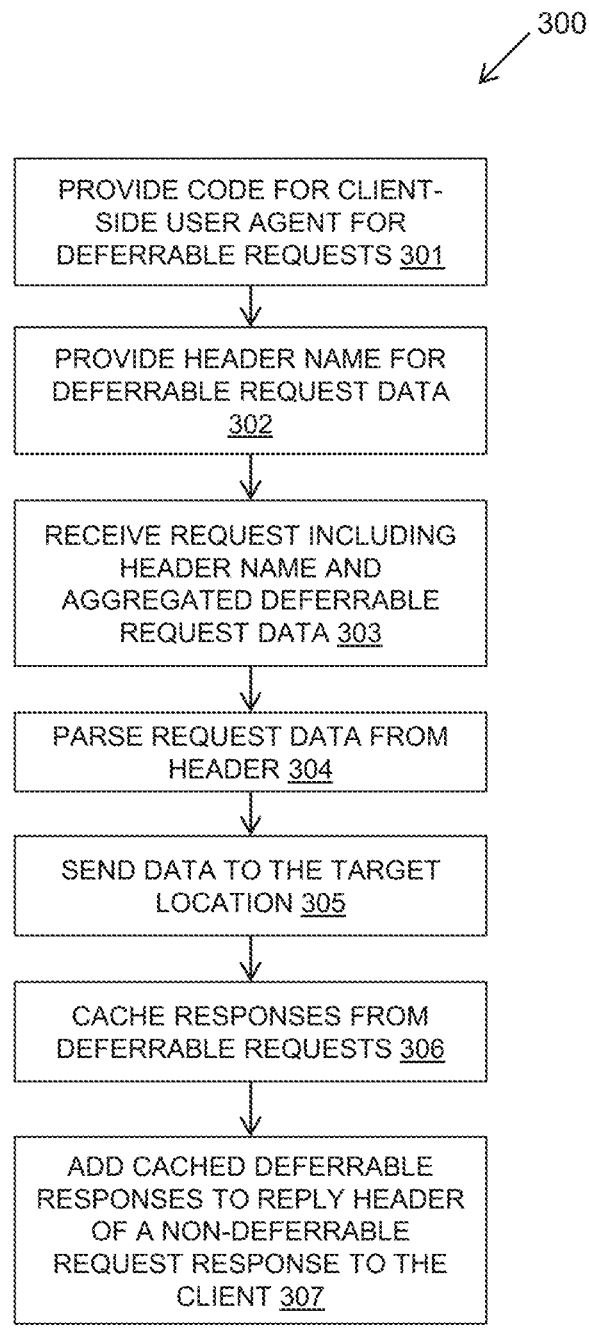
FIGS. 3A and 3B are flow diagrams of example embodiments of aspects of a method at a server, in accordance with the present invention.

Referring to FIG. 3A, a flow diagram 300 shows an example embodiment of the described method as carried out at a server 120 by a server deferrable request handling system 150.

The server deferrable request handling system 150 may provide 301 code for client-side user agents, such as web browsers, client applications, etc., that send HTTP request messages to the server 120.

The server deferrable request handling system 150 may provide 302 a defined header name for use when sending deferrable request messages embedded in a header of another request message. In the case of a custom header, the client-side may call a known server route, for example, /api/getDeferrableHeader, that responds with the name of the header that is going to be used for that session (for example, which may be generated using a universally unique identifier). Alternatively, a fixed defined header name may be used for all such messages, for example, "X-Deferrable-Data".

The server deferrable request handling system 150 may receive 303 a request including one or more headers with the defined header name and having embedded aggregated deferrable request data in the or each header. The aggregated deferrable request data may combine a target destination of the deferrable request and data of the deferrable request. The method may parse 304 the embedded aggregated deferrable request data from the header and may send 305 the extracted data to the target destination provided in the aggregated deferrable request data.

Responses from deferrable requests may be cached 306 at the server 120 and when a non-deferrable request is returning a response, any deferrable request responses in the cache may be added 307 in a reply header. The client-side may then extract and process the deferrable request responses appropriately.

Figure 3B:
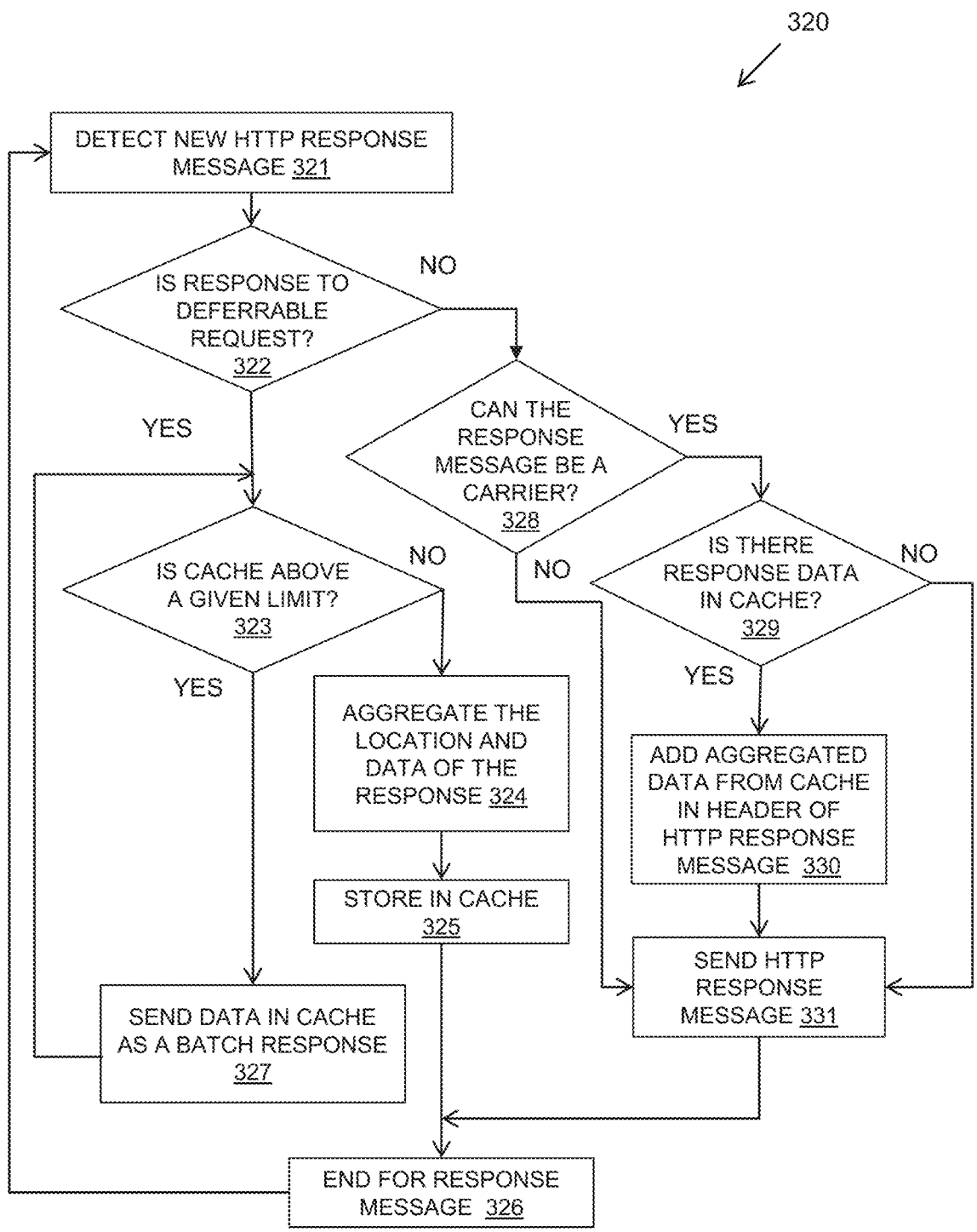

Referring to FIG. 3B, a flow diagram 320 shows further details of the example embodiment of the described method as carried out at a server 120 by a server deferrable request handling system 150.

The method at the server may detect 321 a new HTTP response message to be sent to a client and it determines 322 if the response message is a response to a deferrable request which is therefore also deferrable. The response message may be determined 322 to be deferrable by checking if the response is to a request message that was sent to a host in a list that is pre-configured as be held by the server.

If the response message is considered to be deferrable, the method may determine 323 if a cache of deferrable response messages is above a given limit. If the cache is not above a given limit, the new deferrable response message is aggregated 324 to a form comprising the response destination and the data of the response and stored 325 in the cache. The method may then end 326 for this response message and the method may loop to detect 321 a new response message.

If the cache is determined 323 to be above a given limit, the cached deferrable response data may be sent 327 as a batch response message to clear or make room in the cache. A special response may be made for sending 327 the batch response message, which is treated like a non-deferrable response, such that the cached responses are attached to it. Once room has been made in the cache, further deferrable response data can be stored.

If it is determined 322 that a response message is not deferrable, it may be determined 328 if the response message is suitable to be a carrier response message for deferrable response messages. For example, if there is space in the response message to carry one or more deferrable response messages in one or more headers. If there is not sufficient space or other reason for the response message not to carry a deferrable response message, the method may send 331 the response message without carrying any deferrable response messages. The method may then end 326 for this request message and the method may loop to detect 321 a new request message.

If the response message is suitable to be a carrier response message, the method may check 329 if there is response message data in the cache. If there is no cached response message data, then the method may send 331 the request message. If there is cached response message data, the aggregated form of the destination and the data of a cached response is added 330 to a header field of the carrier response message. Multiple deferrable responses may be attached to one carrier message and they may be attached via separate headers, for example, "X-Deferrable-Data" and then "X-Deferrable-Data-2", "X-Deferrable-Data-3", etc.

Once the deferrable request message data has been added to the message response header field or fields, the response message may be sent 331. The method may then end 326 for this response message and the method may loop to detect 321 a new request message.

Figure 4:
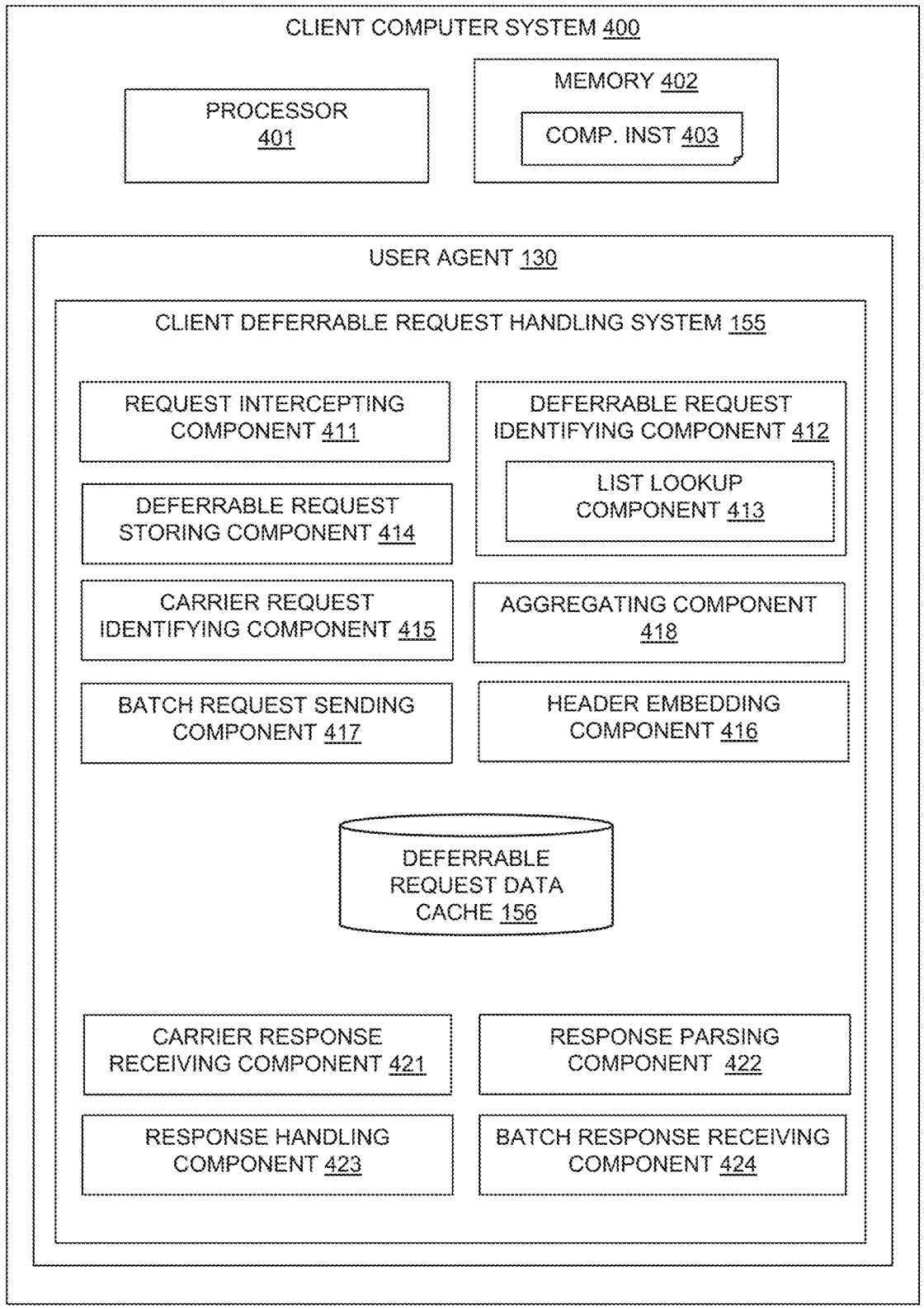
FIG. 4 is block diagram of an example embodiment of a server system, in accordance with an aspect the present invention.

Referring to FIG. 4, a block diagram shows a client computer system 400 at which a client deferrable request handling system 155 may be provided for use by a user agent 130 at the client computer system 400.

The server includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components. The client deferrable request handling system 155 may be provided by a server for execution at the client computer system 400 in conjunction with the server deferrable request handling system 150.

The client deferrable request handling system 155 may include a request intercepting component 411 for intercepting a network request at the user agent 130 such as at a native browser network level or as a function of a client application. The client deferrable request handling system 155 may include a deferrable request identifying component 412 component for identifying a network request as being deferrable. The deferrable request identifying component 412 may include a list lookup component 413 for looking up a pre-configured list provided by the server of destination hostnames to which requests may be deferrable.

The client deferrable request handling system 155 may include a deferrable request storing component 414 for storing the data of the deferrable network request in a local deferrable request data cache 156 at the client computer system 400 and an aggregating component 418 for aggregating the data of a deferrable network request as a combination of a target destination and a request message data.

The client deferrable request handling system 155 may include a carrier request identifying component 415 for identifying a suitable carrier network request and a header embedding component 416 for embedding the aggregated data of each of multiple deferrable requests from the cache 156 within multiple headers of the carrier network request. The header embedding component 416 may obtain from a server a defined header name for use when embedding deferrable request data in the header.

The client deferrable request handling system 155 may include a batch request sending component 417 for batch sending cached deferrable network request data once the cache reaches a predefined size or when leaving the user agent.

The client deferrable request handling system 155 may also include components for handling responses received in response carrier messages including a carrier response receiving component 421 for receiving a carrier network response with embedded data of a response to a deferable network request within a header of the carrier network response and a response parsing component 422 for parsing the embedded data from the header into a separate response message for actioning at the client by a response handling component 423. A batch response receiving component 424 may also be provided for receiving and handling batched responses to deferrable network requests.

Figure 5:
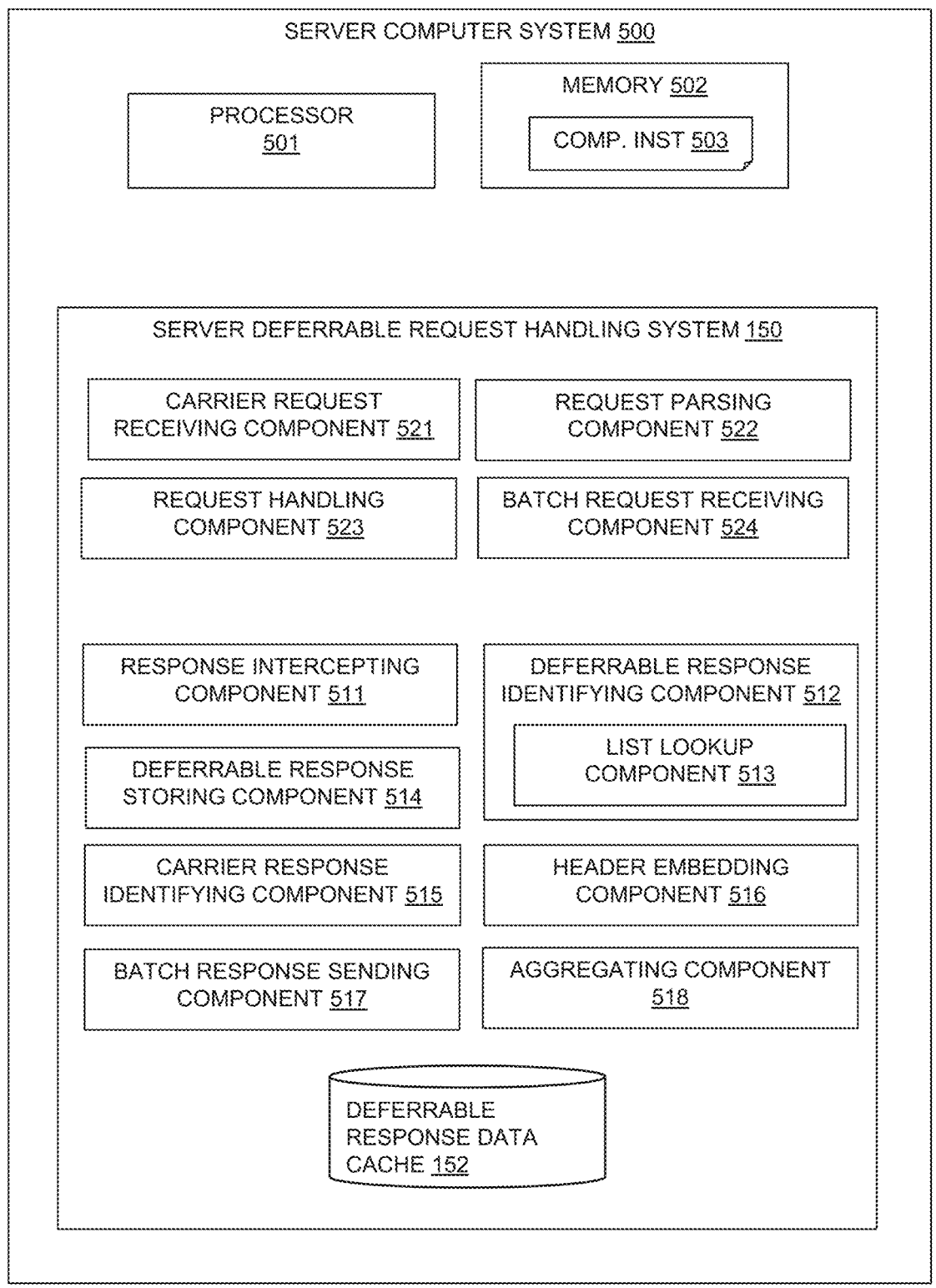
FIG. 5 is block diagram of an example embodiment of a client system, in accordance with another aspect the present invention.

Referring to FIG. 5, a block diagram shows a server computer system 500 at which a server deferrable request handling system 150 is provided.

The server includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The server deferrable request handling system 150 may include a carrier request receiving component 521 for receiving a carrier network request with embedded data of a deferrable network request within a header of the carrier network request and a request parsing component 522 for parsing the embedded data from the header into a separate request message for actioning by a request handling component 523 at the server computer system 500. The server deferrable request handling system 150 may include a batch request receiving component 524 for receiving a batch of deferrable network requests for individual processing at the server computer system 500.

The server deferrable request handling system 150 may include a response intercepting component 511 for intercepting a network response and a deferrable response identifying component 512 for identifying a deferrable network response, for example, by using a list lookup component 513 to look up a pre-configured list provided by the server of destination hostnames from which responses may be deferrable.

The server deferrable request handling system 150 may include a deferrable response storing component 514 for storing the data of a deferrable network response in a local deferrable response data cache 152 at the server computer system 500. An aggregating component 518 may aggregate the deferrable response data of a target destination of the deferrable network response and a response message data for storing in the cache 152.

The server deferrable request handling system 150 may include a carrier response identifying component 515 for identifying a suitable carrier network response and a header embedding component 516 for embedding data of the deferrable network response within a header of a suitable carrier network response for sending back to a client.

The server deferrable request handling system 150 may include a batch response sending component 517 for batch sending cached deferrable network response data once the cache reaches a predefined size at the server.

Figure 6:
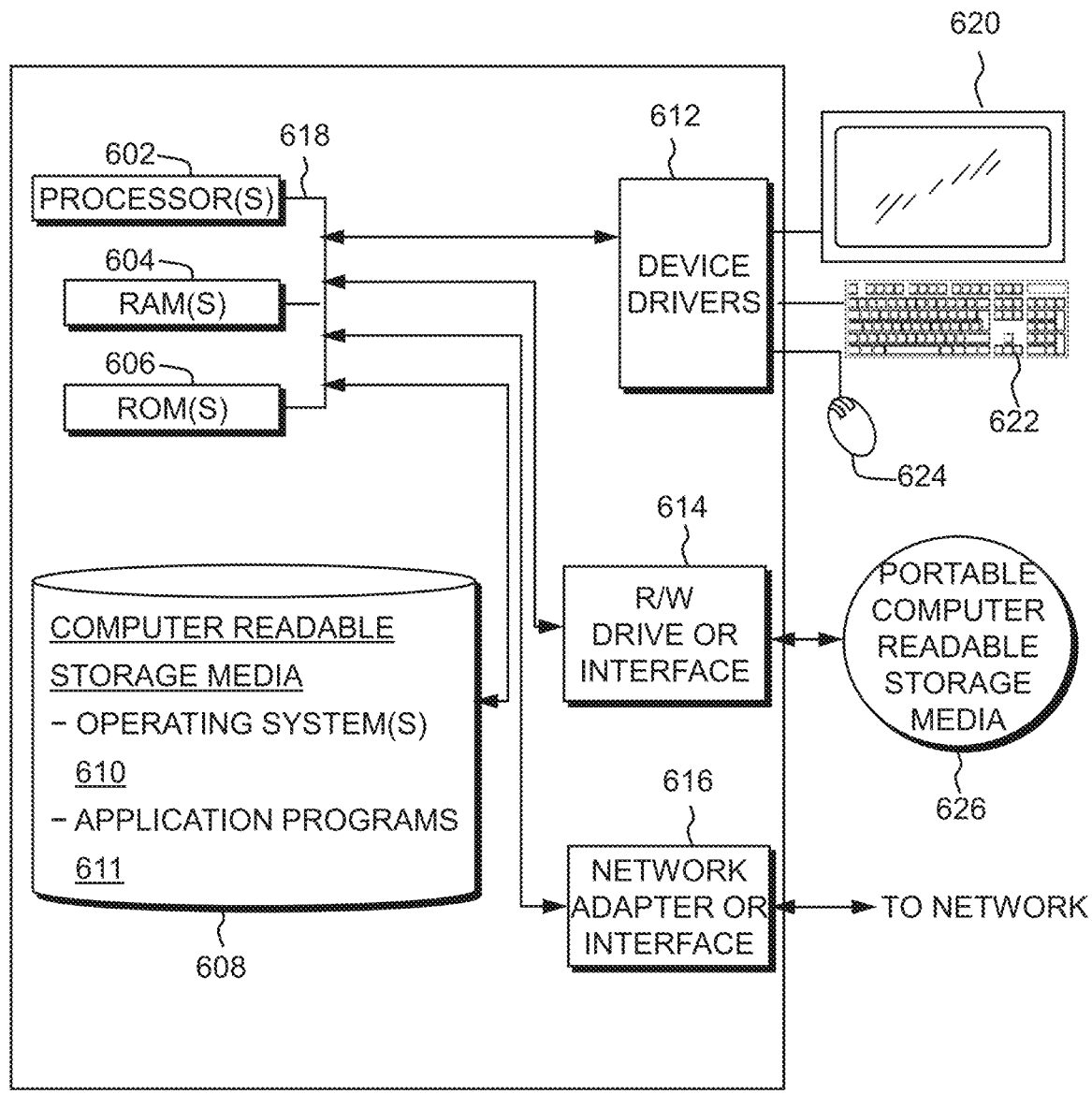
FIG. 6 is a block diagram of an embodiment of a computer system or cloud server, in which the present invention may be implemented.

FIG. 6 depicts a block diagram of components of a computing system as used for the server computer system 400 or client computer system 500, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as the server deferrable request handling system 150 and the client deferrable request handling system 155, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
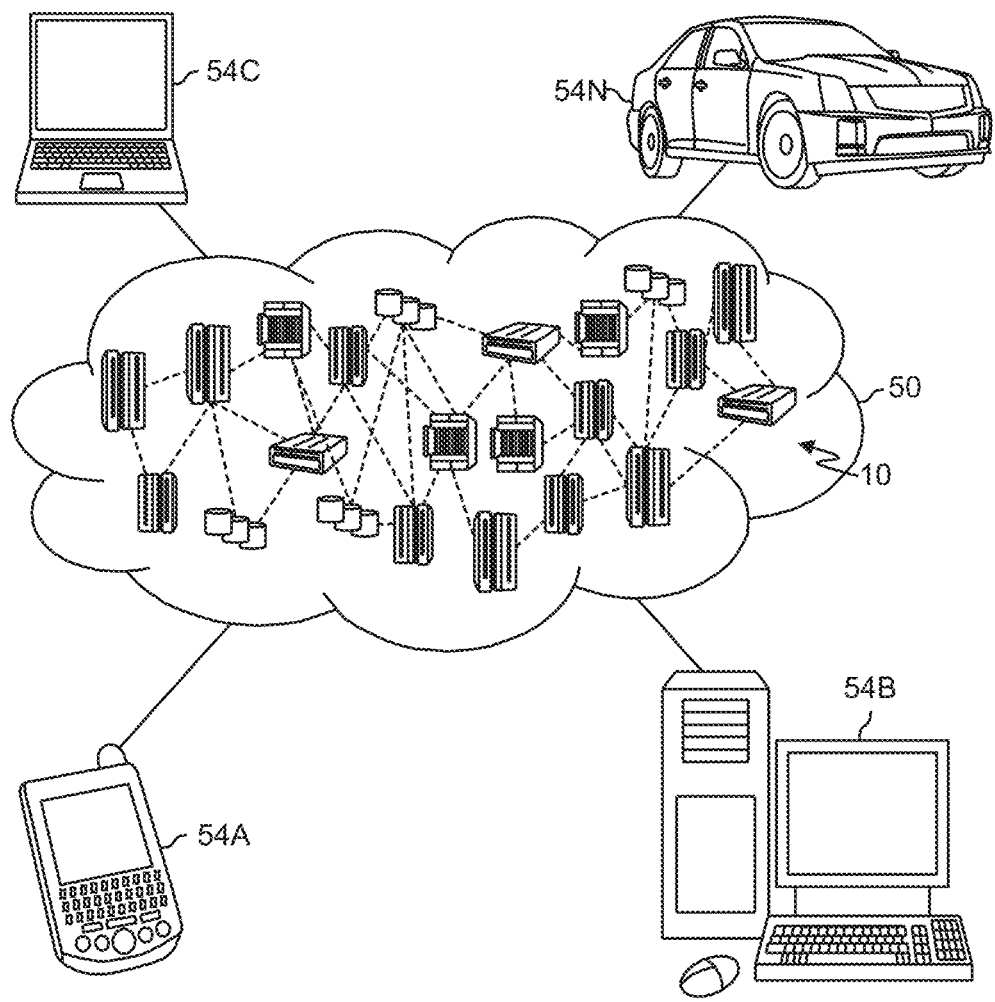
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
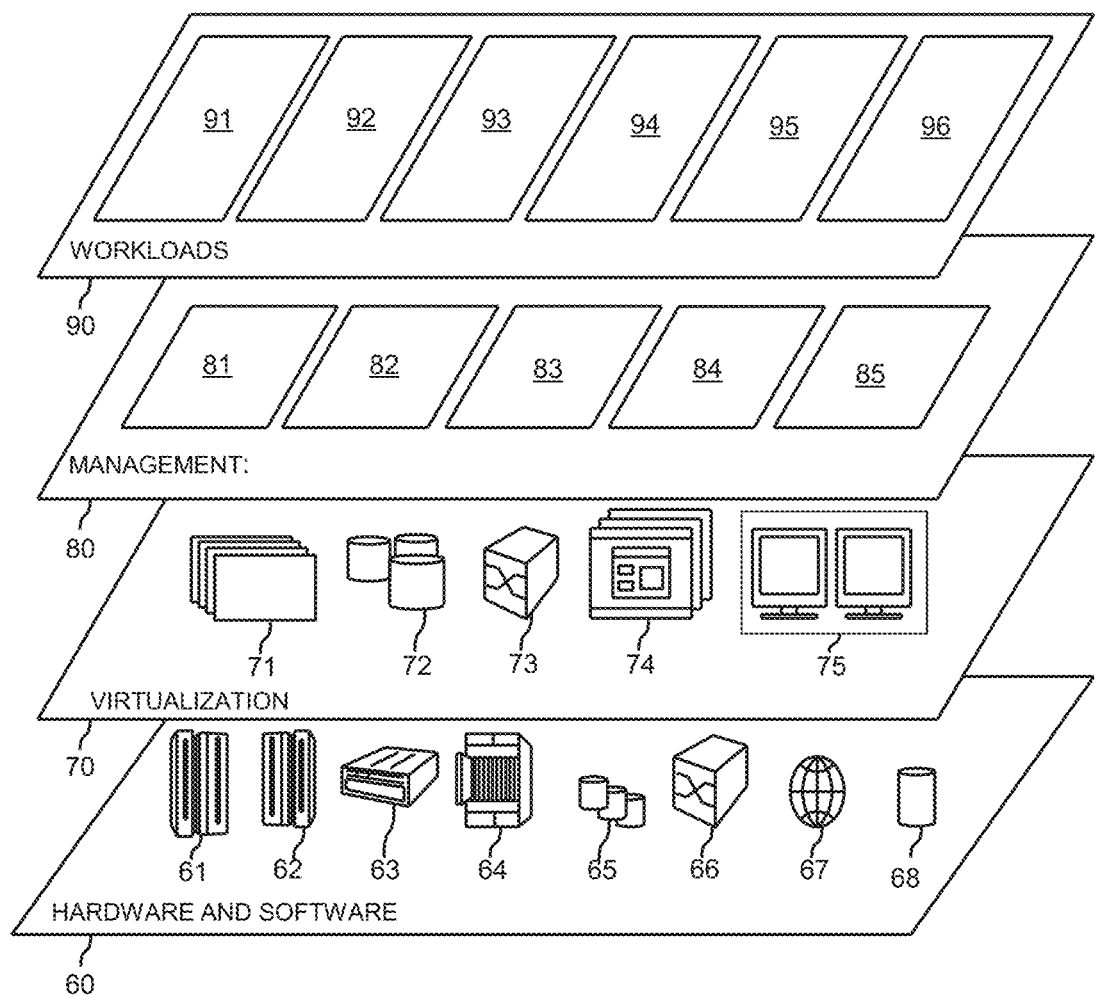
FIG. 8 is a diagram of abstraction model layers of a cloud computing environment, in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and request deferring processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
   intercepting a network message comprising one or more network requests before transmitting the network message to a remote server;
   identifying a network request of the one or more network requests of the network message as being deferrable based on purpose and time sensitivity associated with portions of the network request by a user agent of a client;
   in response to identifying a subsequent network message as being non-deferrable based on functional purpose and increased time sensitivity, embedding data associated with the network request of the network message identified as being deferrable within a header of the subsequent network message for sending to the remote server; and
   in response to detecting movement away from the user agent, sending the embedded data within the header of the subsequent network message to the remote server as a separate request from the intercepted network message.

2. The computer-implemented method as claimed in claim 1, further comprising: storing the data of the deferrable network request in a local cache at the client in the form of aggregated data of a target destination of the deferrable network request and a request message data; identifying a suitable carrier network request; and embedding the aggregated data of the deferrable request within the header of the carrier network request.

3. The computer-implemented method of claim 2, further comprising: embedding the aggregated data of each of multiple deferrable requests within one of multiple headers of the carrier network request.

4. The computer-implemented method of claim 1, wherein the suitable carrier network request is not deferrable and has a sufficient space for the deferrable request data.

5. The computer-implemented method of claim 1, wherein identifying a network request as being deferrable includes intercepting a network request message and determining if the request network message is being sent to a host in a list of predefined deferrable destinations.

6. The computer-implemented method of claim 1, further comprising: obtaining from a server a defined header name for use when embedding deferrable request data in the header.

7. The computer-implemented method of claim 2, further comprising: batch sending cached deferrable network request data once the cache reaches a predefined size or when leaving the user agent, wherein batch sending selects a cached deferrable network request as a carrier network request and adds other cached deferrable request data in one or more headers of the carrier network request.

8. The computer-implemented method of claim 1, further comprising: receiving a carrier network response with embedded data of a response to a deferrable network request within a header of the carrier network response; and parsing the embedded data from the header into a separate response message for actioning at the client.

9. The computer-implemented method of claim 1, further comprising: for each deferrable network request that is added to a suitable carrier network message, marking the deferrable network request as in progress and updating the deferrable network request when a successful response is received.

10. The computer-implemented method of claim 1, further comprising: storing data associated with the network request identified as being deferrable; in response to receiving a subsequent network message, determining whether the subsequent network message as being non-deferrable; in response to determining that the subsequent network message as having space within its header, embedding the data associated with the network request identified as being deferrable into the subsequent network message within the header of the subsequent network message.

11. A system for handling deferrable network requests, comprising:
    a client system including a processor and a memory configured to provide computer program instructions to the processor to execute the function of the components:
    a request intercepting component for intercepting a network message comprising one or more network requests before transmitting the network message to a remote server intercepting a network request and a deferrable request identifying component for identifying a network request of the one or more network requests of the network message as being deferrable based on purpose and time sensitivity associated with portions of the network request by a user agent of a client;
    a heading component for, in response to identifying a subsequent network message as being non-deferrable based on functional purpose and increased time sensitivity, embed data associated with the network request of the network message identified as being deferrable within a header of the subsequent network message for sending to the remote server; and
    program instructions stored on computer readable storage media that is executed by the processor to, in response to detecting an exit event from the user agent, send the embedded data within the header of the subsequent network message to the remote server as a separate special batch request.

12. A computer program product comprising:
    one or more computer readable storage media and program instructions stored on the one or more computer readable storage media, the program instructions comprising:
    program instructions to intercept a network message comprising one or more network requests before transmitting the network message to a remote server;
    program instructions to identify a network request of the one or more network requests of the network message as being deferrable based on purpose and time sensitivity associated with portions of the network request by a user agent of a client;

program instructions to, in response to identifying a subsequent network message as being non-deferrable based on functional purpose and increased time sensitivity, embed data associated with the network request of the network message identified as being deferrable within a header of the subsequent network message for sending to the remote server; and program instructions to, in response to detecting an exit event from the user agent, send the embedded data within the header of the subsequent network message to the remote server as a separate special batch request.

13. The computer program product of claim 12, wherein the computer program product is client system further comprising program instructions stored on the one or more computer readable storage media, wherein the program instructions further comprise program instructions to store the data of the deferrable network request in a local cache at the client in the form of aggregated data of a target destination of the deferrable network request and a request message data; and program instructions to identify component for identifying a suitable carrier network request.

14. The computer program product of claim 13, wherein the program instructions stored on the one or more computer readable storage media further comprise: program instructions to send cached deferrable network request data once the cache reaches a predefined size or when leaving the user agent; and program instructions to receive batched responses to deferrable network requests.

15. The computer program product of claim 12, wherein the program instructions stored on the one or more computer readable storage media further comprise: program instructions to a receive a carrier network response with embedded data of a response to a deferable network request within a header of the carrier network response; and program instructions to parse the embedded data from the header into a separate response message for actioning at the client.

* * * * *